June 12, 1934. B. M. LEECE ET AL 1,962,992
GENERATING SYSTEM
Filed June 18, 1930
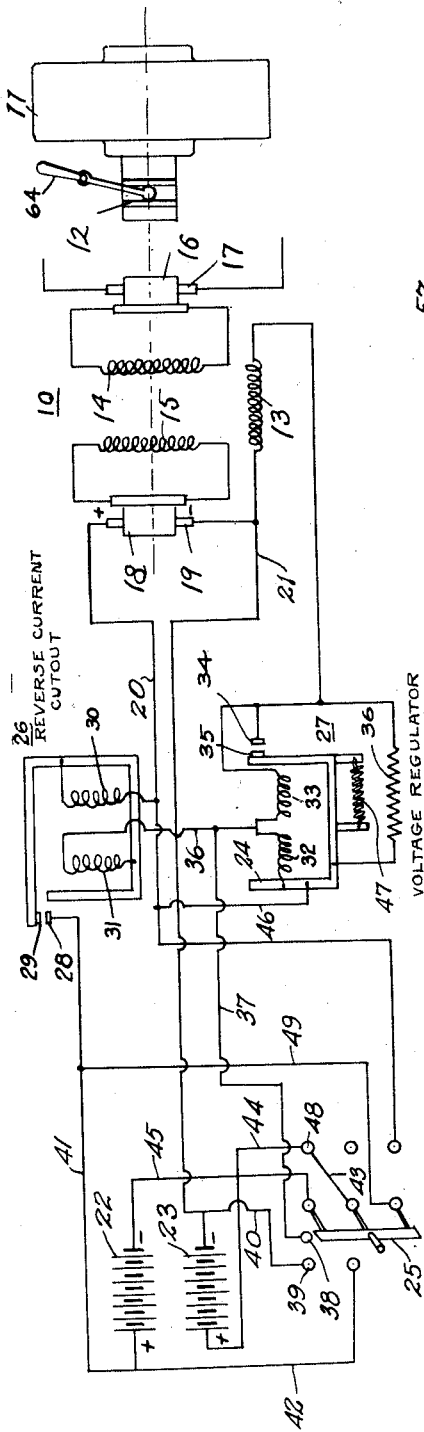
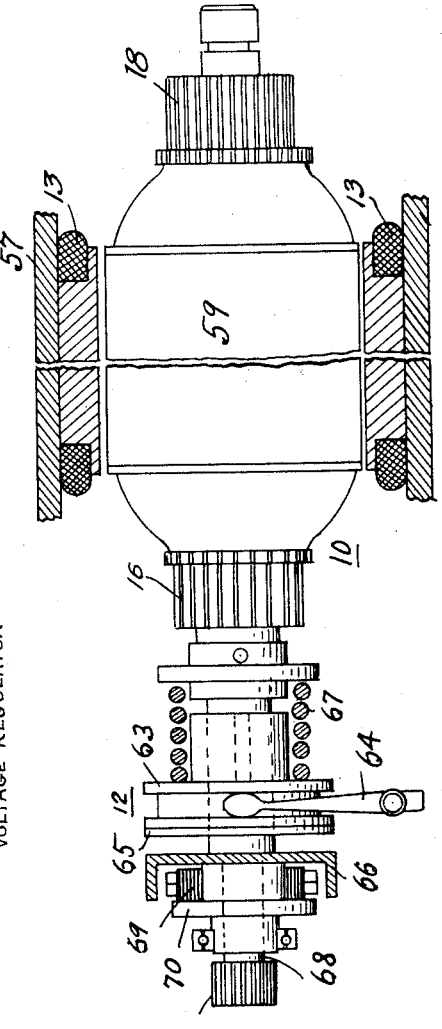

Patented June 12, 1934

1,962,992

UNITED STATES PATENT OFFICE

1,962,992

GENERATING SYSTEM

Bennett M. Leece, Cleveland, and Dale S. Cole, Cleveland Heights, Ohio, assignors to The Leece-Neville Company, Cleveland, Ohio, a corporation of Ohio Application June 18, 1930, Serial No. 461,990

1 Claim. (Cl. 171—313)

This invention relates to generating systems for supplying vehicles, such as aircraft, with high voltage current for radio communication.

In systems of this kind generators are now being used having windings for generating high voltage current for transmission of radio signals, as well as windings for generating low voltage current for such uses as lighting and battery charging. These double voltage generators are usually so arranged that they are driven only while the vehicle driving motor is operating, that is, while the vehicle is in transit, and during the time that the vehicle is at rest, such as when an aircraft has landed, the driving motor is stopped and no source of high voltage energy is available. Consequently during such a condition of rest radio signals cannot be transmitted from the vehicle unless it is provided with auxiliary equipment which, because of its weight, would be undesirable.

It is, therefore, an object of this invention to provide a vehicle generating system in which one of the windings of a double voltage generator is adapted to be energized for driving the generator when the prime mover of the vehicle has been stopped.

Another object of this invention is to provide a vehicle generating system in which a double voltage generator is adapted to be disconnected from the prime mover when the same has been stopped, and to be driven by supplying energy from a battery to one of the windings of the generator.

Other objects and advantages of the invention will be apparent from the following description, taken in connection with the accompanying sheet of drawings, in which Figure 1 is a diagrammatic view showing a vehicle generating system embodying our invention.

Fig. 2 is a longitudinal sectional view showing clutch and connecting means which may be employed for driving the generating apparatus embodied in the systems of our invention.

In the drawing, to which detailed reference will now be made, we have represented, more or less diagrammatically, a vehicle generating system which embodies our invention. In this system the generator is of the type having windings for delivering both high and low voltages, and which is adapted to be disconnected from the vehicle prime mover when the latter has been stopped, and to be driven by current supplied to one of the windings so that high voltage current will be available for the transmission of radio signals when the vehicle is at rest. While the system which we have shown illustrates the principle of our invention, it will be understood, of course, that our invention may also be embodied in other generating systems and arrangements.

In the system represented diagrammatically in Fig. 1 of the drawing we have shown a double voltage generator 10, adapted to be driven by the prime mover 11, through a driving connection 12, which includes suitable clutch mechanism. The generator itself is provided with a frame in which is arranged a suitable field winding 13, and in which an armature, having a winding 14 for generating high voltage current and a winding 15 for generating low voltage current, is rotatably supported. The high voltage current generated by the winding 14, is delivered in the usual manner through the commutator 16 and the brushes 17 associated therewith, and may be used for the transmission of radio signals or for any other desired purpose. The low voltage current which is generated in the winding 15 is delivered through the commutator 18 and brushes 19 associated therewith to the mains 20 and 21. This low voltage current may be used for energizing the field winding 13, for heating vacuum tube filaments, for lighting purposes, and for charging the storage batteries 22 and 23.

When the prime mover 11 has been stopped, such as when the vehicle has been brought to rest, the generator 10 is also stopped and no current is delivered from the commutators 16 and 18, consequently during this period no radio signals can be transmitted. In order that the generator may be driven and radio signals transmitted during such a period of rest, we provide suitable clutch means in the driving connection 12, whereby the generator may be disconnected from the prime mover 11 and may be driven by energizing the winding 15 by current supplied from the batteries 22 and 23. In the hook-up which connects the batteries with the generator, we provide a double throw switch having a movable member 25 and suitable connections, whereby the batteries 22 and 23 may be charged in parallel by the current generated in the winding 15 during the normal operation of the vehicle, and may be discharged in series for providing sufficient voltage to drive the generator at a suitable speed to generate the desired voltage in the winding 14. It will be readily seen from the arrangement of conductors and from the circuits as hereinafter traced, that when the switch member 25 is closed by moving the handle thereof to the left, it connects the batteries in parallel for charging from the winding 15, and when the switch is closed by moving the handle thereof to the right, these batteries are connected in series to deliver their maximum voltage to the winding 15 to drive the generator after the same has been disconnected from the prime mover 11.

It is usually desirable, though not altogether necessary that our generating system embody regulating means, such as that disclosed in United States patent to B. M. Leece, No. 1,767,180, issued June 24, 1930, and comprising a reverse current cut-out 26 and a voltage regulator 27, which are connected in the system intermediate the generator 10 and the storage batteries 22 and 23.

The reverse current cut-out is provided with the usual cooperating contacts 28 and 29, which are located in the charging circuit for the batteries, and with the usual magnetizing coils 30 and 31. The coil 30 is a series coil which maintains the cooperating contacts in closed position during the charging of the batteries. The coil 31 is a shunt coil which is arranged to be connected across the brushes of the commutator 18 when the switch member 25 is in the battery charging position, and which initially closes the contacts 28 and 29 at the beginning of the charging operation.

The voltage regulator 27 embodies a pair of magnetizing windings 32 and 33 in additive relation, and a pair of cooperating stationary and movable contacts 34 and 35. The coil 32 is a demagnetizing or regulating coil, which responds to the voltage of the generator at the brushes 19, and which regulates the rate of vibration of the contact 35 in response to operating conditions of the generator while the batteries 22 and 23 are being charged. The winding 33 is an operating winding which causes the contact 35 to be rapidly vibrated for intermittently connecting a resistance 36 into, and short-circuiting the same from, the circuit of the field winding 13. The windings 32 and 33 correspond respectively with the windings 21 and 22 of the Leece Patent No. 1,540,698, wherein the function of these windings is described in greater detail.

It is desirable that the reverse current cut-out 26 and the voltage regulator 27 operate in the usual manner during the time that the generator 10 is being driven from the prime mover 11 and the batteries 22 and 23 are being charged. It is also desirable that when the generator has been disconnected from the prime mover and is being operated by the current supplied from the batteries 22 and 23, the reverse current cut-out and the voltage regulator 27 be rendered inoperative. Accordingly, we have provided appropriate circuit connections whereby this desired operation may be obtained, and we shall now proceed to more specifically point out these circuit connections.

Assuming first that the switch member 25 has been swung toward the left or, in other words, into position for the parallel charging of the batteries 22 and 23, and that the generator 10 has just been connected to the prime mover by manipulation of the clutch lever 64. As the voltage of the generator builds up, current is supplied from the commutator 18, through the conductor 20 to the reverse current cut-out and to the voltage regulator. The current flowing to the reverse current cut-out traverses the series coil 30, the frame of the cut-out and the voltage coil 31. After traversing the coil 31, the current flows through conductor 36 and through conductor 37 to the contact 38, then through the switch member 25 to contact 39 and back to the commutator 18 of the generator through conductors 40 and 21.

The flow of current through the voltage coil 31 of the cut-out causes the contacts 28 and 29 to be closed, whereupon a direct connection is established from the commutator 18 to the batteries for parallel charging thereof. This supply circuit may be traced from the commutator 18, through conductor 20, through series coil 30 of the cut-out, then through the frame of the cut-out and through contacts 28 and 29. During the charging of the batteries these contacts are held closed by the action of the series coil 30 and from these contacts the circuit may be traced further through conductor 41 to the positive side of the battery 22, and through conductor 42, switch member 25 and conductors 43 and 44 to the positive side of the battery 23. The other side of this main charging circuit may be traced from the negative side of the battery 22, through conductor 45 and switch member 25 to the contact 39, to which contact the negative side of the battery 23 is also connected through the conductor 40. Since the contact 39 is connected to the commutator 18, through conductors 40 and 21, it will be seen that these conductors complete the return circuit from the negative side of the batteries.

The circuit which supplies current to the voltage regulator, during the battery charging operation, may likewise be traced from the commutator 18, through conductors 20 and 46, to the frame 24 of the regulator, at which point the circuit divides and one part flows through the voltage coil 32, and the other part serves to energize the regulator coil 33 and the field winding 13. The portion of the current which traverses the coil 32 flows through the conductor 37 to the contact 38, and then through the switch member 25 to the contact 29, and then back to the commutator through conductors 40 and 21. When the contacts 34 and 35 are open the other portion of the current flows through resistance 36 and back to the commutator through the field 13, with a portion of the current returning to the commutator through the winding 33, the conductor 37, contact 38 and then through switch member 25, contact 29 and conductors 40 and 21. Since the resistance 36 is then included in the circuit of the field 13, the strength of the field will be reduced and the terminal voltage of the generator will likewise be reduced. The reduced terminal voltage of the generator results in a decrease in the magnetization of the frame of the regulator allowing the spring 47 to close the contacts 34 and 35, thereby short-circuiting the resistance 36 out of the field circuit and allowing the terminal voltage of the generator to build up. The building up of the terminal voltage of the generator again increases the magnetization of the regulator frame, resulting in the contacts 34 and 35 being opened against the action of the spring 47 and the resistance 36 again being inserted in the field circuit.

When the prime mover 11 has been stopped and it is desirable to operate the generator 10 by using the winding 15 thereof, as a motoring winding, the clutch lever 64 is moved to disconnect the generator from the prime mover and the switch member 25 is then swung toward the right, so that the batteries 22 and 23 will be connected in series with each other and current at a higher voltage will be supplied to the motoring winding. When the switch member 25 is in the right hand position, current will then be supplied from the positive side of the battery 23, through the conductor 44 to the contact 48, and then through switch member 25 and conductor 45 to the negative side of the battery 22. From the positive side of the battery 22 the circuit may be traced further through conductor 41, conductor 49 to the switch member 25, and then through conductor 20 to the commutator 18. The return circuit may be traced from the commutator through the conductor 21 to the negative side of the battery 23.

During the time that the switch member 25 is in the right hand position and the batteries 22 and 23 are connected in series for supplying current to the motoring winding 15, the reverse current cut-out and the voltage regulator are inoperative or, in other words, the reverse current cut-out remains open and has no effect upon the circuit connections between the batteries and the generator and, likewise, the regulator exercises no control over the field 13. During this time the field energization remains substantially constant, (except for variation in the terminal voltage of the series-connected batteries) as is desirable during the motoring operation. The field energizing circuit for the motoring operation may be traced from the positive conductor 20, through conductor 46, to the frame 24 of the regulator, and then through contacts 34 and 35 which are maintained closed by the spring 47, and through the field winding 13 back to the negative conductor 21.

In Fig. 2 of the drawing we have shown one form which the generator 10 and the driving connection 12 may assume. This generator comprises a frame 57 having a plurality of field coils constituting the shunt field 13, and an armature 59 which is rotatably supported in the frame. The double voltage generator windings 14 and 15, shown in Fig. 1, are disposed on the armature 59, and are connected, respectively, to the commutators 16 and 18, so that currents may be delivered simultaneously from the generator at different voltages.

For connecting and disconnecting the generator and the prime mover of the vehicle we provide clutch means at one end of the armature shaft. This clutch means may be of any desired construction, and as shown in Fig. 2, comprises a collar 63 splined to the armature shaft and adapted to be moved axially thereof by means of the actuating lever 64. The collar 63 is provided with a clutch disc 65 which is normally held in engagement with the face of the housing member 66 by the action of the spring 67. The housing member 66 is rotatable on the armature shaft and is connected to the drive shaft 68 through the springs 69 of the flexible connection 70. This flexible connection may be of any desired construction, but we prefer to use a connection of the type disclosed in copending application Serial No. 140,057, filed October 7, 1926 in the name of Bennett M. Leece and which application has since matured into Patent 1,875,040, issued August 30, 1932. By means of the pinion 71 the drive shaft 68 is rotated from the prime mover, and in turn the armature shaft is rotated by the cooperation of the clutch disc with housing member 66. By actuating the lever 64 the clutch disc may be disengaged from the housing member 66 against the action of the spring 67, thus disconnecting the generator from the prime mover.

It will now be readily seen that we have provided an efficient form of vehicle generating system, in which high voltage current may be generated in one of the windings of a double voltage generator by supplying power to another winding of the generator after the latter has been disconnected from the prime mover. By means of the system which we have devised it is possible to transmit radio signals while the vehicle prime mover is stopped, as well as while the vehicle is in transit, and at the same time our system does not involve any material increase in the weight of the electrical equipment of the vehicle, nor does it involve the use of auxiliary apparatus.

While we have described the generating system of our invention in a detailed manner, it should be understood, however, that we do not intend to limit ourselves to the precise details and arrangements shown and described, but regard our invention as including such changes and modifications as do not involve a departure from the spirit of the invention and the scope of the appended claim.

In generating systems of the type which we have disclosed we prefer to use generators which are provided with shunt field windings, as indicated in the drawing, however, it may be desirable in certain instances, to employ generators having series or compound field windings, in these systems.

Having thus described our invention what we claim is:

In apparatus of the character described the combination of a prime mover, a generator having a winding for generating high voltage current and another winding for generating low voltage current, clutch means whereby said generator may be driven by said prime mover and disconnected therefrom when the latter is not delivering power, a plurality of storage batteries, and means whereby said batteries may be charged in parallel by the low voltage current generated by the second mentioned winding and may be discharged in series through said second mentioned winding for driving said generator to thereby generate high voltage current in the first mentioned winding when the generator is disconnected from said prime mover.

BENNETT M. LEECE.
DALE S. COLE.